United States Patent [19]

Imanishi et al.

[11] Patent Number: 4,809,105
[45] Date of Patent: Feb. 28, 1989

[54] FLEXIBLE RECORDING MEDIUM TENSIONING MAGNETIC RECORDING HEAD

[75] Inventors: Kiyokazu Imanishi, Higashiosaka; Wataru Watanabe, Osaka; Kiyoshi Kobata, Takatsuki, all of Japan

[73] Assignee: Matsushita Electric Industrial Co., Ltd., Osaka, Japan

[21] Appl. No.: 902,953

[22] Filed: Sep. 2, 1986

[30] Foreign Application Priority Data

Sep. 2, 1985 [JP] Japan .................................. 60-193511

[51] Int. Cl.$^4$ ....................... G11B 5/48; G11B 17/32; G11B 21/20
[52] U.S. Cl. ..................................... 360/104; 360/99; 360/130.34
[58] Field of Search ................... 360/97, 99, 102, 104, 360/130.34; 369/261

[56] References Cited

U.S. PATENT DOCUMENTS

| 4,074,331 | 2/1978 | O'Reilly et al. ...................... 360/104 |
| 4,320,426 | 3/1982 | Thompson ........................... 360/104 |

FOREIGN PATENT DOCUMENTS

| 54-43710 | 4/1979 | Japan ...................................... 360/99 |
| 59-215073 | 12/1984 | Japan ............................... 360/130.34 |
| 60-43257 | 3/1985 | Japan .................................... 360/104 |
| 60-83279 | 5/1985 | Japan ...................................... 360/97 |
| 60-243867 | 12/1985 | Japan .................................... 360/104 |

OTHER PUBLICATIONS

Grometer et al., "Compliant Head Mounting", IBM Tech. Disc. Bull., vol. 5, No. 1, Jun. 1962.
Patent Abstracts of Japan, vol. 9, No. 86, 4/16/85.
Patent Abstracts of Japan, vol. 9, No. 105, 5/9/85.
IBM Technical Disclosure Bulletin, vol. 21, No. 7, Dec. 1978.
IBM Technical Disclosure Bulletin, vol. 20, No. 11A, Apr. 1978.

Primary Examiner—John H. Wolff
Attorney, Agent, or Firm—Wenderoth, Lind & Ponack

[57] ABSTRACT

A magnetic recording and/or reproducing device for recording information on a disc-like magnetic recording medium and/or reproducing the information from it, said magnetic recording and/or reproducing device having a pair of magnetic head members each composed of a magnetic head chip and a slide pad for slidably holding the disc-like magnetic recording medium at its both surfaces between the pair of magnetic head members under a predetermined contact pressure, wherein the slide pad is so disposed as to surround the magnetic head chip and the top portion of the magnetic head chip is so disposed as to protrude by a predetermined amount from a sliding contact surface between the slide pad and the disc-like magnetic recording medium. It makes possible by the magnetic recording and/or reproducing device of the above described type to obtain such a desirable state in which the disc-like magnetic recording medium can be steadily held in contact with the magnetic head chips, since the slide pads act primarily to minimize the warp of the disc-like magnetic recording medium and also the deformation of the disc-like magnetic recording medium which would result from a deviation in position of one or both of the magnetic head members relative to the disc-like magnetic recording medium.

6 Claims, 3 Drawing Sheets

FLEXIBLE RECORDING MEDIUM TENSIONING MAGNETIC RECORDING HEAD

BACKGROUND OF THE INVENTION

The present invention generally relates to a magnetic recording and/or reproducing device and more particularly, to a magnetic recording and/or reproducing device for use with a disc-like flexible recording medium.

Conventionally, a magnetic recording and/or reproducing device as shown in FIG. 1 has been used as one of means for magnetically recording on or reproducing from both surfaces of a disc-like flexible recording medium, for example, a floppy disc.

More specifically, there are disposed a pair of head slides 2 and 3 facing each other so as to hold therebetween a floppy disc 1 at its upper and lower surfaces under a predetermined contact pressure. Magnetic head portions 4 and 5, buried in the head slides 2 and 3 respectively, are held in contact with the floppy disc 1 under a predetermined contact stress for magnetically recording thereon and/or reproducing therefrom. The head slides 2 and 3 are composed of ceramics and accommodate therein respective magnetic head portions 4 and 5 composed of ferrite. Furthermore, the head slides 2 and 3 are smoothly ground at their contact surfaces with respect to the floppy disc 1.

In the above described magnetic recording and/or reproduction, the characteristic thereof fully depends upon the quality of a state in which the magnetic head portions 4 and 5 and the floppy disc 1 are held in contact with each other. In the case where the floppy disc 1 is imperfectly flat, for example, the deformation thereof can not be sufficiently rectified between the pair of upper and lower head slides 2 and 3, favorable recording and/or reproduction can not be achieved owing to the fact that the floppy disc 1 is not satisfactorily brought into contact with the magnetic head portions 4 and 5.

The aforementioned problem becomes remarkably conspicuous in the case where the recording density is increased. That is, as the recording density becomes high, the floppy disc 1 and the magnetic head portions 4 and 5 are required to minimize a spacing loss at their contact portion and accordingly, it becomes necessary to improve the flatness of the floppy disc 1 or to improve the accuracy of the relative positioning of the floppy disc 1 and the magnetic head portions 4 and 5. Thus, the magnetic recording and/or reproducing device of the above described type has been manufactured at increased cost, or such dan not be practically obtained in a state where it has desirable performance capabilities to make it possible to record on and/or play back from the floppy disc 1.

SUMMARY OF THE INVENTION

Accordingly, the present invention has been developed with a view to substantially eliminate the above described disadvantages inherent in the prior art magnetic recording and/or reproducing device, and has for its essential object to provide an improved magnetic recording and/or reproducing device intended for utilizing both surfaces of such a disc-like flexible magnetic recording medium as floppy disc, which device is capable the state in which the disc-like magnetic recording medium and the magnetic head portions are steadily held in contact with each other and accordingly, is capable of realizing magnetic recording and/or reproduction at high density, even if there exists a warp in the disc-like magnetic recording medium or a deviation in the relative positions between the disc-like magnetic recording medium and the magnetic head portions.

Another important object of the present invention is to provide a magnetic recording and/or reproducing device of the above described type that is capable of minimizing vibration caused by a sliding friction produced between the floppy disc and the head slides.

In accomplishing these and other objects, according to one preferred embodiment of the present invention, there is provided a magnetic recording and/or reproducing the information therefrom, the magnetic recording and/or reproducing device including a pair of magnetic head members for slidably holding the disc-like magnetic recording medium therebetween under a predetermined contact pressure, with each of the magnetic head members being composed of a magnetic head chip and a slide pad. The slide pad is so disposed so as to surround the magnetic head chip at predetermined intervals, and the top portion of the magnetic head chip is so disposed so as to protrude by a predetermined amount from a sliding contact surface of the slide pad with the disc-like magnetic recording medium.

By employing the magnetic head members having the above described construction, it becomes possible, at the positions where the slide pads locate, to minimize the warp of the disc-like magnetic recording medium and the deviation in position of one or both of the magnetic head members relative to the disc-like magnetic recording medium, particularly in a direction perpendicular thereto, owing to the fact that the disc-like magnetic recording medium remarkably depends, in configuration in the vicinity of the magnetic head members, upon a plane which is determined by the sliding contact surface of the slide pads with the disclike magnetic recording medium, irrespective of the previous state of the disc-like magnetic recording medium.

Consequently, a device has been realized for obtaining a desirable state in which the disc-like magnetic recording medium is steadily held in contact with the magnetic head members without any influence from the aforementioned warp of the disc-like magnetic recording medium or the like.

In another aspect of the present invention, there is provided a magnetic recording and/or reproducing device of the above described type, wherein fine fiber materials or the like are adhered to the slide pad at the sliding contact surfaces thereof so as to be slidably in contact with the disc-like magnetic recording medium.

BRIEF DESCRIPTION OF THE DRAWINGS

These and other objects and features of the present invention will become apparent from the following description taken in conjunction with the preferred embodiment thereof with reference to the accompanying drawings, throughout which like parts are designated by like reference numerals, and in which.

DETAILED DESCRIPTION OF THE INVENTION

Figure 1:
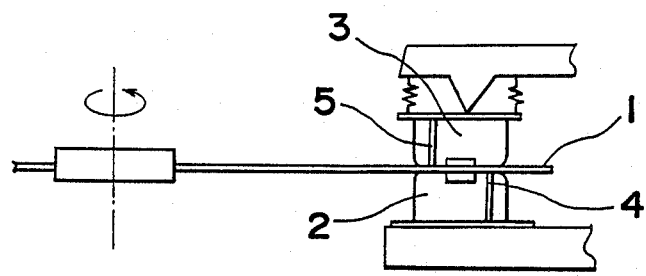
FIG. 1 is a side elevational view of a PRIOR ART magnetic recording and/or reproducing device (already referred to)
Figure 2:
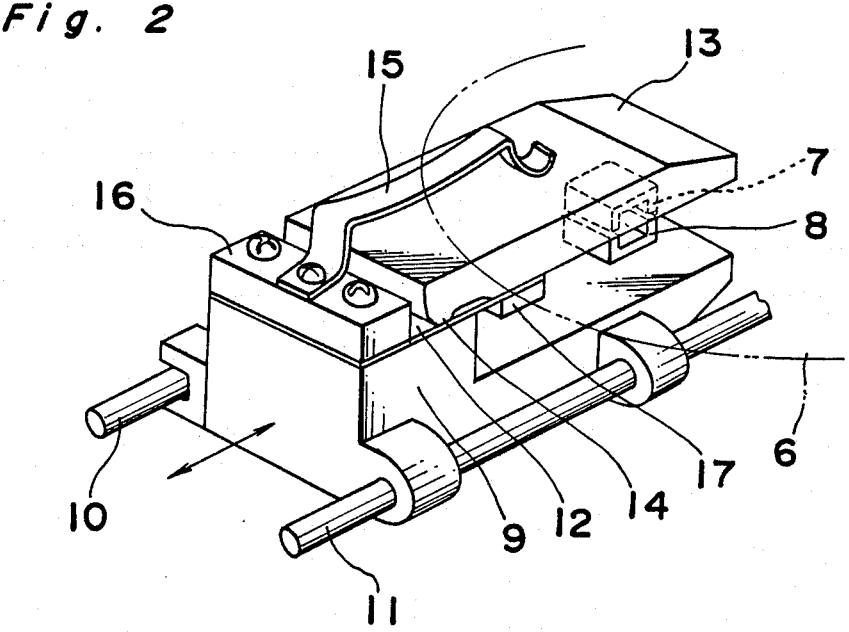
FIG. 2 is a perspective view showing a magnetic head supporting mechanism for mounting a pair of magnetic head members thereon according to one preferred embodiment of the present invention.

Referring now to the drawings, FIG. 2 illustrates a magnetic head supporting mechanism for securely mounting a pair of magnetic head members 7 and 8 thereon, according to one preferred embodment of the present invention.

Signals are recorded on or reproduced from a floppy disc 6 in a state where the floppy disc 6 is held at its both surfaces between a pair of magnetic head members 7 and 8 under a predetermined contact pressure, said floppy disc 6 being composed of a sheet made of MYLAR TM (trade name of a polyethylene terephthalate from Du Pont) having a thickness of approximately 0.08 mm, which sheet is coated by such a magnetic material as $\gamma\text{-Fe}_2\text{O}_3$ or the like on both surfaces thereof. The magnetic head member 8 is securely mounted on a carriage 9 which is reciprocable through a couple of guide rods 10 and 11 fixedly mounted on a base (not shown) of a magnetic recording and/or reproducing device (not shown). Another magnetic head member 7 is fixedly mounted, through a gimbal (not shown), on one end portion of an arm 13 pivotally connected to the carriage 9 through a flat spring 12. A circular arcuate pivotal portion 14 is formed on the other end portion of the arm 13 as a center for pivotal movement thereof and is so connected to the carriage 9 as to hold the flat spring 12 therebetween under the influence of a force exerted by a spring 15 which is disposed so as to hold the floppy disc 6 between the magnetic head members 7 and 8 under the aforementioned predetermined contact pressure. A couple of holding members 16 and 17 are disposed on the flat spring 12 for connecting thereto the carriage 9 and the arm 13 respectively.

Figure 3:
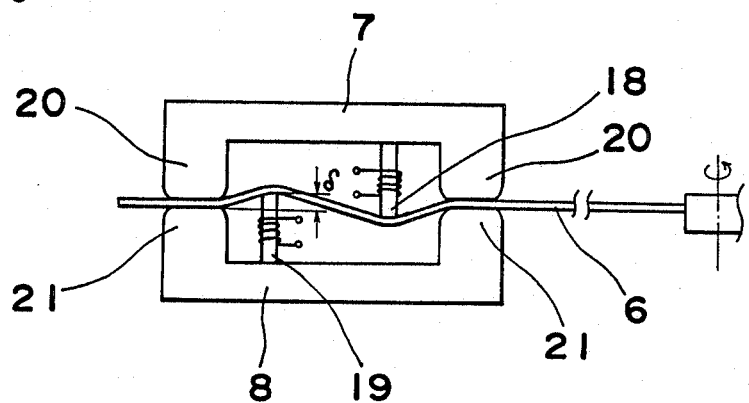
FIG. 3 is a side elevational view of a floppy disc and the pair of magnetic head members for use in the magnetic recording and/or reproducing device of the present invention for particularly showing a mutual relationship thereof.

In FIG. 3, there is shown a state in which the pair of magnetic head members 7 and 8 and the floppy disc 6 are held in contact with each other. Each of the magnetic head members 7 and 8 is composed of a magnetic head chip 18 or 19 and a slide pad 20 or 21. Each of the slide pads 20 and 21 is made of barium titanate having a high abrasion resistance and is ground smoothly at its contact surfaces with the floppy disc 6 so as not to damage the floppy disc 6 through sliding contact therewith. These slide pads 20 and 21 are so disposed as to respectively surround the magnetic head chips 18 and 19 at predetermined intervals in the radial direction of the floppy disc 6 and are so designed that the magnetic head chips 18 and 19 protrude at their top portions by a desired amount $\delta$ from the contact surfaces between the floppy disc 6 and the slide pads 20 and 21. Furthermore, the magnetic head chips 18 and 19 are located at different positions in the radial direction of the floppy disc 6 so as not to face each other at their top portions.

At this moment, the contact pressure produced between the pair of the magnetic head members 7 and 8 acts primarily to minimize the warp of the floppy disc 6 and also the deformation of the floppy disc 6 that would result from a deviation in position of one or both of the magnetic head members 7 and 8 relative to the floppy disc 6 in a direction perpendicular thereto.

On the other hand, a contact pressure between the floppy disc 6 and both of the magnetic head chips 7 and 8 for recording and reproducing magnetically is obtained as a deformation resistance in the case where the magnetic head chips 18 and 19 are forced against the sloppy disc 6 by the amount $\delta$. That is, given that the contact pressure is mainly determined only by the deformation resistance of the floppy disc 6 and the protruding amount $\delta$ of the magnetic head chips 18 and 19, it becomes possible to obtain the state in which the floppy disc 6 is steadily held in contact with the magnetic head members 7 and 8 without any influence from such an external factor as the aforementioned warp of the floppy disc 6 or the like, if only the dimensional amount $\delta$ has been possible to realize the magnetic recording and/or reproduction of a high density which has been hardly obtained so far.

Figure 4:
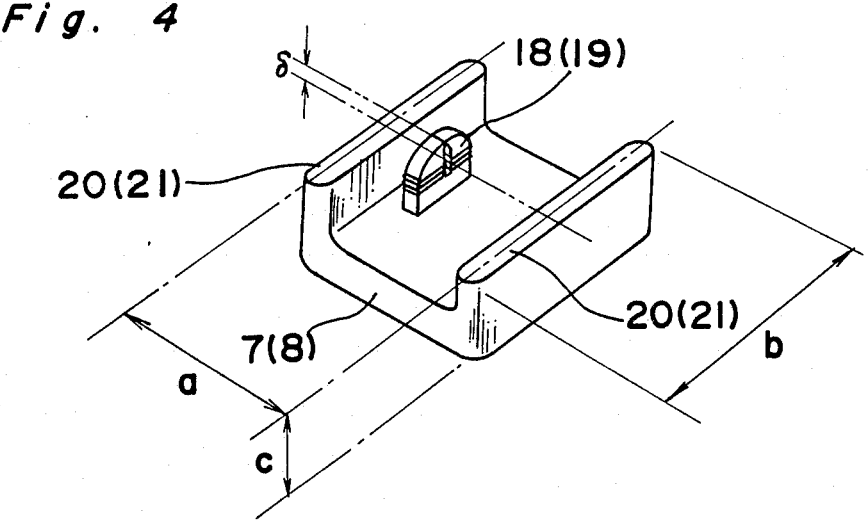
FIG. 4 is a perspective view of one of the magnetic head members of FIG. 3.
Figure 5:
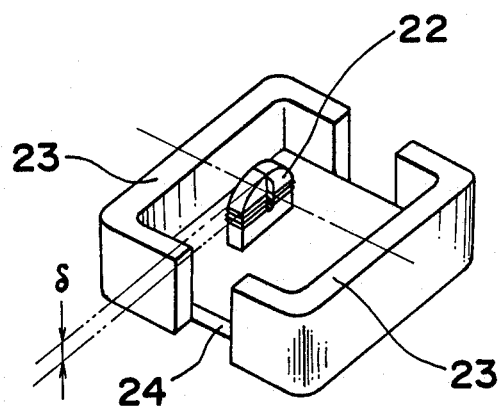
FIGS. 5 through 9 are views similar to FIG. 4 which particularly show modifications thereof.

In this embodiment, the dimensions of the magnetic head member 8 as shown in FIG. 4 have been determined as $a = 6$ mm, $b = 6$ mm, $c = 3.5$ mm and $\delta =$ approximately 0.05 mm, and the magnetic head members 7 and 8 made of ferrite have been forced against the floppy disc 6 by the force of 2 gf to 10 gf. Furthermore, the floppy disc 6 has been coated by such a magnetic material as $\gamma\text{-Fe}_2\text{O}_3$. Under the above described conditions, it has become possible to obtain a linear recording density three times greater than that of the conventional manner under the same conditions.

Figure 6:
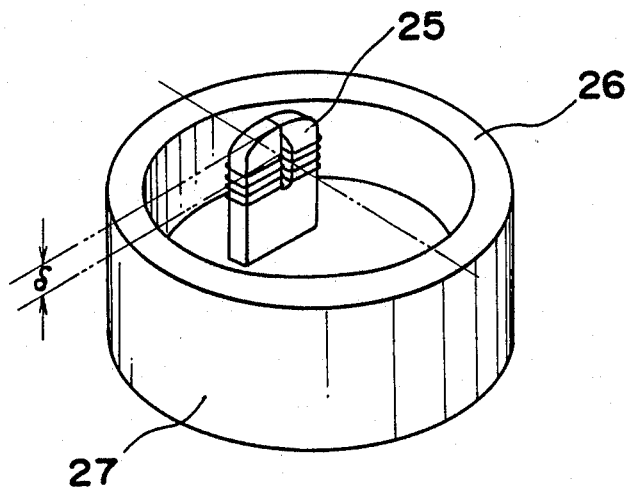
Figure 7:
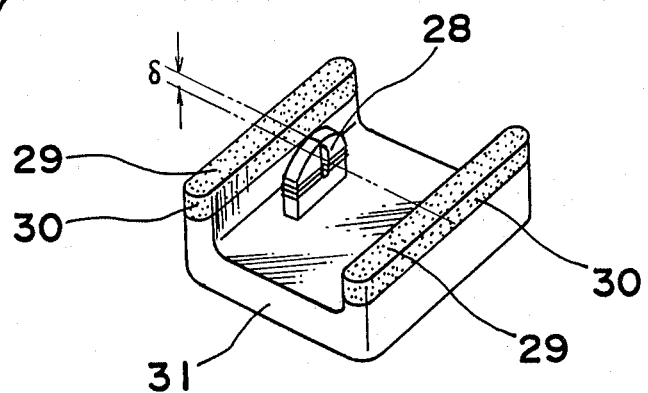
Figure 8:
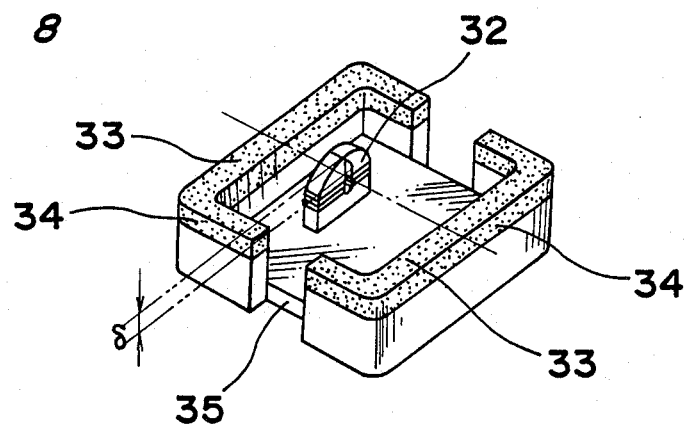
Figure 9:
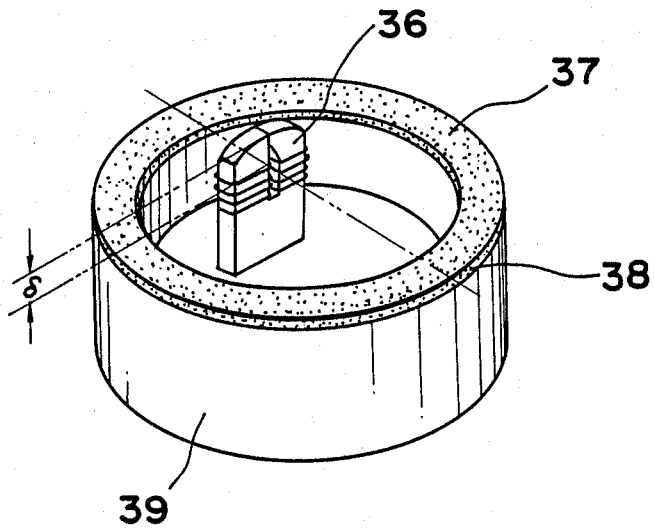

FIGS. 5 to 9 illustrate various kinds of magnetic head members according to further embodiments of the present invention. In the magnetic head member 24 of FIG. 5, additional projections (unnumbered) are formed with the slide pad 20 or 21 of the magnetic head member 7 or 8 of FIG. 4 for restricting the floppy disc also in the circumferential direction thereof. The magnetic head member 27 of FIG. 6 is so formed as to surround the magnetic head chip 25 by the slide pad 26 shaped like a closed curve. The magnetic head members 31, 35 and 39 of FIGS. 7, 8 and 9 have configurations similar to those of the magnetic head members 8, 24 and 27 of FIGS. 4, 5 and 6, respectively. In addition, nonwoven fabrics 29, 33 and 37 such as felts or the like are adhered to the portions of the contact surfaces 30, 34 and 38 of the slide pads in the vicinity of the floppy disc in order that the vibration caused by the sliding contact between the floppy disc and the slide pads is desirably reduced by allowing them to softly contact with each other so as to absorb the aforementioned vibration through elasticity of the nonwoven fabric. In this case, because the main portions of the slide pads exert no influence on the sliding friction, it is not necessary to use barium titanate or the like. It is preferable to avoid such ceramics as they are difficult to be machined.

It is to be noted that in the foregoing embodiment, although the nonwoven fabric is employed as the material applied to the surfaces of the slide pads, the slide pads may be so modified as to employ other fine fiber materials or the like therein for reducing the vibration caused by the sliding contact.

According to the present invention, given that there are disposed a pair of magnetic head members holding therebetween a disc-like flexible recording medium (floppy disc) at its upper and lower surfaces and each composed of a slide pad held in sliding contact with the floppy disc and a magnetic head chip disposed at predetermined intervals from the slide pad and furthermore, each of the magnetic head members is so formed that the top portion of the magnetic head chip protrudes by a predetermined amount from the contact surfaces of the slide pad with the floppy disc. The contact pressure produced between the floppy disc and both of the magnetic head chips can be determined without being directly influenced by the warp of the floppy disc and the deformation thereof which would result from a deviation in position of one or both of the magnetic head members relative to the floppy disc in a direction perpendicular thereto. As a result, a device has been realized for obtaining a desirable state in which the floppy disc is steadily held in contact with the magnetic head members for achieving the magnetic recording and/or reproduction of a high density which has been hardly obtained so far.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A magnetic recording and/or reproducing device for recording information on a disc-like magnetic recording medium rotatable around a drive shaft and/or reproducing the information therefrom, said magnetic recording and/or reproducing device comprising:
   a set of holding members;
   a pair of magnetic head means securely mounted on said holding members respectively for slidably holding a disc-like magnetic recording medium therebetween under a predetermined contact pressure for recording and/or reproducing information thereon, each of said pair of magnetic head means including a magnetic head chip and a slide pad, and each said magnetic head means radially aligning each said slide pad and each said magnetic head chip with respect to the center of rotation of the disc-like magnetic recording medium substantially on a common radial line and substantially within the plane of the disc-like magnetic recording medium;
   each said slide pad being spaced from each said magnetic head chip, said slide pads being spaced from each other, and said magnetic chip heads being spaced from each other; and
   each said magnetic head chip extending a predetermined amount past the plane in which each said slide pad contacts the disc-like magnetic recording medium for controlledly deforming the disc-like magnetic recording medium substantially radially outwardly with respect to the center of rotation of the disc-like recording medium for high density information recording and/or reproducing.

2. A magnetic recording and/or reproducing device as claimed in claim 1, wherein each said slide pad has at least one projection extending substantially perpendicular to the radial line extending from the center of rotation of the disc-like magnetic recording medium and substantially within the plane of the disc-like recording medium.

3. A magnetic recording and/or reproducing device as claimed in claim 1, wherein each said slide pad is shaped like a closed curve and surrounds each said magnetic head chip.

4. A magnetic recording and/or reproducing device for recording information on a disc-like magnetic recording medium rotatable around a drive shaft and/or reproducing the information therefrom, said magnetic recording and/or reproducing device comprising:
   a set of holding members;
   a pair of magnetic head means securely mounted on said holding members respectively for slidably holding a disc-like magnetic recording medium therebetween under a predetermined contact pressure for recording and/or reproducing information thereon, each of said pair of magnetic head means including a magnetic head chip and a slide pad, and each said magnetic head means radially aligning each said slide pad and each said magnetic head chip with respect to the center of rotation of the disc-like magnetic recording medium substantially on a common radial line and substantially within the plane of the disc-like magnetic recording medium;
   each said slide pad being spaced from each said magnetic head chip, said slide pads being spaced from each other, and said magnetic chip heads being spaced from each other;
   fine fiber material attached to each said slide pad for contacting the disc-like magnetic recording medium; and
   each said magnetic head chip extending a predetermined amount past the plane in which each said slide pad contacts the disc-like magnetic recording medium for controlledly deforming the disc-like magnetic recording medium substantially radially outwardly with respect to the center of rotation of the disc-like recording medium for high density information recording and/or reproducing.

5. A magnetic recording and/or reproducing device as claimed in claim 4, wherein each said slide pad has at least one projection extending substantially perpendicular to the radial line extending from the center of rotation of the disc-like magnetic recording medium and substantially within the plane of the disc-like recording medium.

6. A magnetic recording and/or reproducing device as claimed in claim 4, wherein each said slide pad is shaped like a closed curve and surrounds each said magnetic head chip.

* * * * *